(12) United States Patent
Pickett et al.

(10) Patent No.: US 7,273,650 B2
(45) Date of Patent: Sep. 25, 2007

(54) WEATHERABLE MULTILAYER RESINOUS ARTICLES AND METHOD FOR THEIR PREPARATION

(75) Inventors: James Edward Pickett, Schenectady, NY (US); Randall Lee Carter, Clifton Park, NY (US); Jimmy Lynn Webb, Ballston Lake, NY (US); Daniel Robert Olson, Voorheesville, NY (US); Frank Axel Hoefflin, Evansville, IN (US); Hua Wang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 862 days.

(21) Appl. No.: 10/409,067

(22) Filed: Apr. 8, 2003

(65) Prior Publication Data

US 2003/0207096 A1 Nov. 6, 2003

Related U.S. Application Data

(63) Continuation of application No. 09/368,705, filed on Aug. 5, 1999, now Pat. No. 6,572,956.

(60) Provisional application No. 60/128,339, filed on Apr. 8, 1999.

(51) Int. Cl.
  *B32B 9/00* (2006.01)
  *B32B 27/00* (2006.01)
  *C08L 53/00* (2006.01)
  *G11B 5/64* (2006.01)

(52) U.S. Cl. ............... 428/141; 428/411.1; 428/423.7; 428/40.7; 428/690; 525/92 E; 525/451; 525/461

(58) Field of Classification Search ............... 428/212, 428/423.7, 412, 411.1, 141, 40.7, 690; 525/439, 525/92 E, 451, 461; 528/176, 196, 198
See application file for complete search history.

(56) References Cited

U.S. PATENT DOCUMENTS

| | | | |
|---|---|---|---|
| 3,169,121 A | 2/1965 | Goldberg | |
| 3,207,814 A | 9/1965 | Goldberg | |
| 3,444,129 A | 5/1969 | Young, Jr. et al. | |
| 3,460,961 A | 8/1969 | Young, Jr. et al. | |
| 3,492,261 A | 1/1970 | Young, Jr. et al. | |
| 3,503,779 A | 3/1970 | Young, Jr. et al. | |
| 3,506,470 A | 4/1970 | Young, Jr. et al. | |
| 4,127,560 A | 11/1978 | Kramer | |
| 4,281,099 A | 7/1981 | Maresca | |
| 4,334,053 A | 6/1982 | Freitag et al. | |
| 4,414,230 A | 11/1983 | Hanabata et al. | |
| 4,495,325 A | 1/1985 | DeBergalis et al. | |
| 4,576,842 A | 3/1986 | Hartsing et al. | |
| 4,643,937 A | 2/1987 | Dickinson et al. | |
| 4,931,364 A | 6/1990 | Dickinson | |
| 4,992,322 A | 2/1991 | Curry et al. | |
| 5,030,505 A | 7/1991 | Dickinson | |
| 5,064,704 A | 11/1991 | Stewart | |
| 5,318,850 A | 6/1994 | Pickett et al. | |
| 5,321,114 A | 6/1994 | Fontana et al. | |
| 5,510,182 A | 4/1996 | Fontana et al. | |
| 5,552,463 A | 9/1996 | Akkapeddi et al. | |
| 5,846,659 A | 12/1998 | Lower et al. | |
| 5,916,997 A | 6/1999 | Webb et al. | |
| 6,087,007 A | 7/2000 | Fujii et al. | |
| 6,136,441 A | 10/2000 | MacGregor et al. | |
| 6,143,839 A | 11/2000 | Webb et al. | |
| 6,265,522 B1 | 7/2001 | Brunelle et al. | |
| 6,291,589 B1 | 9/2001 | Brnelle et al. | |
| 6,294,647 B1 | 9/2001 | Brunelle et al. | |
| 6,306,507 B1 | 10/2001 | Brunelle et al. | |
| 6,572,956 B1 * | 6/2003 | Pickett et al. | 428/212 |
| 6,607,814 B2 * | 8/2003 | Pickett et al. | 428/212 |

FOREIGN PATENT DOCUMENTS

| | | |
|---|---|---|
| JP | 1201326 | 8/1989 |
| JP | 06122756 | 5/1994 |
| WO | 0026275 | 5/2000 |

OTHER PUBLICATIONS

William M. Eareckson, III, Journal of Polymer Science, "Interfacial Polycondensation. X. Polyphenyl Esters*", vol. XL, pp. 399-406, 1959.
S. M. Cohen et al., Journal of Polymer Science: Part A-1, "Transparent Ultraviolet-Barrier Coatings", vol. 9,3263-3299 (1971).

* cited by examiner

*Primary Examiner*—Rena Dye
*Assistant Examiner*—Lawrence D. Ferguson
(74) *Attorney, Agent, or Firm*—Cantor Colburn LLP

(57) ABSTRACT

Substantially solvent-free multilayer articles characterized by excellent color retention and gloss retention, solvent resistance and recyclability comprise a substrate layer which may be at least one of polycarbonates, polyesters and ABS and ASA copolymers, and a resinous coating layer which contains resorcinol or alkylresorcinol isophthalate/terephthalate ester units. An intermediate layer may also be present.

3 Claims, No Drawings

WEATHERABLE MULTILAYER RESINOUS ARTICLES AND METHOD FOR THEIR PREPARATION

CROSS-REFERENCE TO RELATED APPLICATION

This application is a continuation of Ser. No. 09/368,705, filed Aug. 5, 1999 U.S. Pat. No. 6,572,956, which claims priority from provisional application Ser. No. 60/128,339 filed Apr. 8, 1999.

BACKGROUND OF THE INVENTION

This invention relates to weatherable multilayer resinous articles and their preparation. More particularly, it relates to articles in sheet form having a protective arylate polymer coating.

Various polymeric articles have a problem of long term color instability. This causes yellowing of the polymer, detracting from its transparency and attractiveness. Loss of gloss can also be an undesirable long term phenomenon.

Yellowing of polymers is often caused by the action of ultraviolet radiation, which is why such yellowing is frequently designated "photoyellowing". Numerous means for suppressing photoyellowing have been employed and proposed. Many of these involve incorporation in the polymer of ultraviolet absorbing compounds (UVA's). For the most part, UVA's are low molecular weight compounds and they must be employed at relatively low levels, typically up to 1% by weight, to avoid degradation of the physical properties of the polymer such as impact strength and high temperature properties as reflected in heat distortion temperature. Such levels may be inadequate to afford sufficient protection. Another problem of concern with polymers such as aromatic polycarbonates and addition polymers of alkenylaromatic compounds such as styrene is susceptibility to attack by organic liquids.

One way of protecting a resinous article against photoyellowing and loss of gloss is to apply a coating of a weatherable second polymer, the term "weatherable" as used herein signifying resistance to such phenomena. Weatherable polymers suitable for this purpose include resorcinol isophthalate/terephthalate copolyarylates. This is the subject of Cohen et al., *J Poly. Sci., Part A*-1, 9, 3263-3299 (1971), and certain related US patents of Monsanto Company including U.S. Pat. Nos. 3,444,129, 3,460,961, 3,492,261 and 3,503,779.

The only method disclosed therein for the application of the weatherable polymer, however, is by solution coating followed by evaporation of the solvent. This method has numerous deficiencies, some of which are mentioned in the Cohen et al. paper at page 3267: namely, the necessity to use high priced and toxic solvents, the inherently low concentration of the arylate polymer in the solvent and the tendency of the solutions to gel. Accordingly, the described copolyarylates were considered "unacceptable coating candidates".

Other serious deficiencies of solvent coating have been discovered since the publication of the Cohen et al. paper and related patents. A principal one is an inherent property of the use of a solvent: it cannot possibly be completely removed by any procedure occurring at a level below the glass transition temperature of the substrate, which is impractical since it causes physical distortion.

Therefore, the solvent remains present in sufficient quantities to adversely affect the properties of the substrate polymer. This can occur by way of volatilization of the remaining traces of solvent during subsequent heat treatment such as thermoforming, lamination, in-mold decoration or baking in a paint oven. On a cosmetic level, the results can include blistering, bubbling, cracking and void formations within the substrate and coating, degrading the appearance of the resulting article. Other adverse results can be degradation of physical properties by crazing, cracking and embrittlement of the substrate polymer.

Since the publication of the Cohen et al. paper, the industry has further recognized the desirability of recycling resinous articles by regrinding, to minimize the deposition of non-biodegradable waste in landfills. Many multilayer resinous articles cannot be recycled, since the substrate and the coating are often incompatible with each other and the recycle operation, which includes conversion to a blend of the two polymers, produces a material with inferior physical properties.

Japanese Kokai 1/199,841 discloses articles having a substrate layer comprising at least 90 mole percent poly (ethylene terephthalate) and a gas barrier coating layer which is a polyester of resorcinol and isophthalic acid, optionally with copolyester units derived from another dicarboxylic acid such as terephthalic acid, naphthalenedicarboxylic acid or various other specifically named dicarboxylic acids. The disclosed articles may be prepared by a series of operations including co-injection molding which are essentially performed entirely in the melt, thereby overcoming the aforementioned deficiencies of solution coating. However, the only types of articles disclosed are bottles, which are produced from a co-injection molded parison by subsequent blow molding. Larger articles intended for outdoor use, such as external automobile body parts, are not disclosed and no method for their production is suggested, nor are articles in which the substrate layer is anything other than poly(ethylene terephthalate).

It remains of interest, therefore, to develop a method for preparing weatherable, solvent resistant multilayer articles which are capable of use for such varied purposes as body parts for outdoor vehicles and devices such as automobiles, and which can be prepared without adverse solvent effects. It is further of interest to prepare articles which include only mutually compatible polymers, making them suitable for recycle.

SUMMARY OF THE INVENTION

The present invention provides multilayer resinous articles which are weatherable, solvent-free and resistant to solvent action by organic liquids. Said articles are also recyclable by reason of the compatibility of the discrete layers therein.

In one of its aspects, the invention includes multilayer articles comprising:

a substrate layer comprising a first material and a coating layer thereon, said coating layer comprising a thermoplastic polyester different from said first material and comprising structural units derived from a 1,3-dihydroxybenzene organodicarboxylate, with the proviso that said coating layer and a 25-micron portion of said substrate layer nearest to said coating layer are substantially free from volatile organic compounds.

Included as part of this aspect are articles in which the coating layer consists of 1,3-dihydroxybenzene organodicarboxylate units, a maximum of 75% by weight, if any, of the substrate layer being poly(ethylene terephthalate). Also included are articles in which the coating layer comprises a block copolyestercarbonate, said substrate limitation not applying thereto.

Another aspect of the invention is a method for preparing a multilayer resinous article which comprises applying in the melt a thermoplastic coating layer to a layer comprising a second material, said coating layer comprising a polyester comprising structural units derived from a 1,3-dihydroxybenzene organodicarboxylate and the above-described substrate limitation existing correspondingly depending on the structure of the coating layer. Still another aspect is multilayer resinous articles prepared by the aforementioned method.

DETAILED DESCRIPTION

Multilayer articles of the invention include, but are not limited to, those which comprise a substrate layer and a coating layer thereon; those which comprise a substrate layer with a coating layer on each side of said substrate layer; and those which comprise a substrate layer and at least one coating layer with at least one interlayer between a substrate layer and a coating layer. Any interlayer may be transparent and/or may contain an additive, for example a colorant or decorative material such as metal flake. If desired, an overlayer may be included over the coating layer, for example to provide abrasion or scratch resistance. The substrate layer, coating layer, and any interlayers or overcoating layers are preferably in contiguous superposed contact with one another.

The first material comprising the substrate layer in the articles of this invention may be, subject to the proviso hereinafter with respect to polyesters, any material capable of receiving an adherent arylate polymer coating. Suitable materials include metals, ceramics, celluosic products and resins. The applicable resins include thermoset and, especially, thermoplastic polymer(s), whether addition or condensation prepared.

Thermoset polymer substrates may include those derived from epoxies, cyanate esters, unsaturated polyesters, diallyl phthalate, acrylics, alkyds, phenol-formaldehyde (including novolacs and resoles), melamine-formaldehyde, urea-formaldehyde, bismaleimides, PMR resins, benzocyclobutanes, hydroxymethylfurans and isocyanates. The invention also encompasses multilayer articles comprising a filled thermoset substrate layer such as a sheet molding compound (SMC), suitable fillers being listed hereinafter.

Cellulosic materials include wood, paper, cardboard, fiber board, particle board, plywood, construction paper, Kraft paper, and like cellulosic-containing materials. The invention also encompasses blends of at least one cellulosic material and either at least one thermoset polymer (particularly an adhesive thermoset polymer), or at least one thermoplastic polymer (particularly a recycled thermoplastic polymer, such as PET or polycarbonate), or a mixture of at least one thermoset polymer and at least one thermoplastic polymer.

Condensation polymers include aromatic polycarbonates, polyesters (other than those employed for the coating layer, as defined hereinafter), polyphenylene ethers, and polyamides. Suitable polycarbonates include homo- and copolycarbonates comprising structural units of the formula

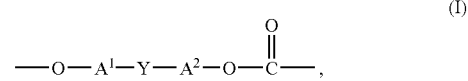

wherein each $A^1$ and $A^2$ is a monocyclic divalent aryl radical and Y is a bridging radical in which one or two carbon atoms separate $A^1$ and $A^2$. For example, $A^1$ and $A^2$ typically represent unsubstituted phenylene or substituted derivatives thereof. The bridging radical Y is most often a hydrocarbon group and particularly a saturated group such as methylene, cyclohexylidene or isopropylidene. The most preferred polycarbonates are bisphenol A polycarbonates, in which each of $A^1$ and $A^2$ is p-phenylene and Y is isopropylidene. Preferably, the weight average molecular weight of the initial polycarbonate composition ranges from about 5,000 to about 100,000; more preferably, from about 25,000 to about 65,000.

The polycarbonate may also be a copolyestercarbonate. Such polymers contain, in addition to the carbonate units of formula I, ester units typically containing $A^1$—Y—$A^2$ moieties linked to aromatic dicarboxylate groups such as isophthalate and/or terephthalate.

Polyesters are illustrated by poly(alkylene dicarboxylates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(butylene naphthalate) (hereinafter sometimes designated "PBN"), poly(cyclohexanedimethanol terephthalate), poly(cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"), Suitable addition polymer substrates include homo- and copolymeric aliphatic olefin and functionalized olefin polymers such as polyethylene, polypropylene, poly(vinyl chloride), poly(vinyl chloride-co-vinylidene chloride), poly(vinyl fluoride), poly(vinylidene fluoride), poly(vinyl acetate), poly(vinyl alcohol), poly(vinyl butyral), poly(acrylonitrile), acrylic polymers such as those of (meth)acrylamides or of alkyl (meth)acrylates such as poly(methyl methacrylate) ("PMMA"), and polymers of alkenylaromatic compounds such as polystyrenes, including syndiotactic polystyrene. The preferred addition polymers for many purposes are polystyrenes and especially the so-called "ABS" and "ASA" copolymers, which contain thermoplastic, non-elastomeric styrene-acrylonitrile side chains grafted on an elastomeric base polymer of butadiene and alkyl acrylate, respectively.

Blends of any of the foregoing polymers may also be employed. These include blends of thermoset polymers with thermoplastic polymers such as polyphenylene ether, polyphenylene sulfide, polysulfone, polyetherimide or polyester. The thermoplastic polymer is typically combined with thermoset monomer mixture before curing. Also included are blends of cellulosic materials and thermoset and/or thermoplastic polymers.

Among blends, thermoplastic blends are often preferred. Especially preferred are blends of polyphenylene ether with polystyrene; polycarbonates with polyesters, ABS copolymers and ASA copolymers, with polycarbonate-polyester blends frequently being most preferred.

However, when the coating layer comprises an arylate polymer consisting of units of formula II or formulas II and III as defined hereinafter, no more than 75%, preferably no more than about 50% and most preferably no more than about 40% by weight of the substrate layer, if any, is PET; often, these maximum percentages apply generically to poly(alkylene terephthalates) including PET, PBT and PTT. In other words, any PET and often any poly(alkylene terephthalate) present in the substrate layer in such articles is in the form of a blend with another polymer, the latter comprising at least 25%, preferably at least about 50% and most preferably at least about 60% of said layer.

This limitation on the substrate does not apply when the coating layer is a block copolyestercarbonate comprising structural units of formula IV as also defined hereinafter. However, the same substrate limitation may be preferred in such instances.

The preferred thermoplastic polymers for the substrate layer are, for the most part, polycarbonates, ABS copolymers, ASA copolymers and blends of polycarbonates with polyesters, ABS copolymers and ASA copolymers. Other thermoplastic polymers may be present therein, but the above-described polymers or blends more preferably constitute the major proportion thereof. The substrate may also incorporate fillers such as silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, calcined clay, talc, kaolin, asbestos, cellulose, wood flour, cork, cotton and synthetic textile fibers, especially reinforcing fillers such as glass fibers and carbon fibers, as well as colorants such as metal flakes, glass flakes and beads, ceramic particles, other polymer particles, dyes and pigments which may be organic, inorganic or organometallic.

Also present in the articles of the invention is a coating layer comprising a thermoplastic polyester comprising structural units derived from a 1,3-dihydroxybenzene organodicarboxylate. Suitable polymers for this purpose, specifically arylate polymers, are disclosed in copending, commonly owned application Ser. No. 09/152,877, the disclosure of which is incorporated by reference herein. Arylate polymers having a glass transition temperature of at least about 80° C. and no crystalline melting temperature, i.e., those that are amorphous, are preferred.

The arylate polymer is typically a 1,3-dihydroxybenzene isophthalate/terephthalate comprising structural units of the formula

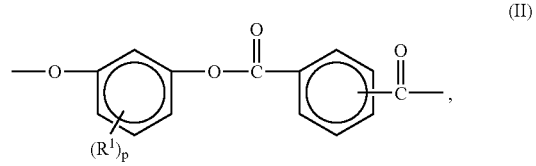

(II)

wherein each $R^1$ is a substituent, especially halo or $C_{1-12}$ alkyl, and p is 0-3, optionally in combination with structural units of the formula

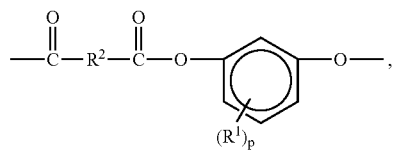

(III)

wherein $R^1$ and p are as previously defined and $R^2$ is a divalent $C_{4-12}$ aliphatic, alicyclic or mixed aliphatic-alicyclic radical.

It is within the scope of the invention for other acid groups, such as those derived from aliphatic dicarboxylic acids such as succinic acid, adipic acid or cyclohexane-1,4-dicarboxylic acid, or from other aromatic dicarboxylic acids such as 1,8-naphthalenedicarboxylic acid, to be present in the coating layer, preferably in amounts no greater than about 30 mole percent. It is also within the scope of the invention for other polyesters which are miscible in at least some proportions with the arylate polymer to be present; these are exemplified by PBT, PET, PTT, and PCCD. Most often, however, the coating layer polymer consists of units of formula II, optionally in combination with units of formula III.

The units of formula II contain a resorcinol or substituted resorcinol moiety in which any $R_1$ groups are preferably $C_{1-4}$ alkyl; i.e., methyl, ethyl, propyl or butyl. They are preferably primary or secondary groups, with methyl being more preferred. The most preferred moieties are resorcinol moieties, in which p is zero, although moieties in which p is 1 are also excellent with respect to the invention. Said resorcinol moieties are most often bound to isophthalate and/or terephthalate moieties.

In the optional soft block units of formula III, resorcinol or substituted resorcinol moieties are again present in ester-forming combination with $R^2$ which is a divalent $C_{4-12}$ aliphatic, alicyclic or mixed aliphatic-alicyclic radical. It is preferably aliphatic and especially $C_{8-12}$ straight chain aliphatic.

It is usually found that the arylate polymers most easily prepared, especially by interfacial methods, consist of units of formula II and especially combinations of resorcinol isophthalate and terephthalate units in a molar ratio in the range of about 0.25-4.0:1, preferably about 0.4-2.5:1, more preferably about 0.67-1.5:1, and most preferably about 0.9-1.1:1. When that is the case, the presence of soft block units of formula IV is usually unnecessary. If the ratio of units of formula III is outside this range, and especially when they are exclusively iso- or terephthalate, the presence of soft block units may be preferred to facilitate interfacial preparation. A particularly preferred arylate polymer containing soft block units is one consisting of resorcinol isophthalate and resorcinol sebacate units in a molar ratio between 8.5:1.5 and 9.5:0.5.

Arylate polymers useful in the articles of this invention may be prepared by conventional esterification reactions which may be conducted interfacially, in solution, in the melt or under solid state conditions, all of which are known in the art. Typical interfacial preparation conditions are described in copending application Ser. No. 09/030,076, the disclosure of which is incorporated by reference herein.

Also useful as arylate polymers according to the invention are the block copolyestercarbonates disclosed and claimed in copending, commonly owned application Ser. No.

09/181,902, the disclosure of which is also incorporated by reference herein. They include block copolymers comprising moieties of the formula

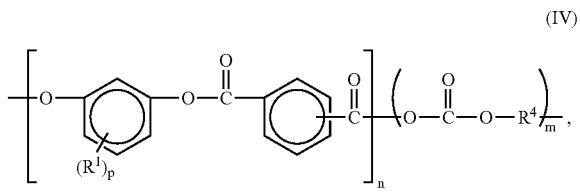

(IV)

wherein $R^1$ and p are as previously defined, each $R^4$ is independently a divalent organic radical, m is at least about 10 and n is at least about 4. Soft block moieties corresponding to formula III may also be present. The arylate blocks thus also contain an unsubstituted or substituted 1,3-dihydroxybenzene moiety. The most preferred moieties are again resorcinol moieties, in which p is zero.

Said 1,3-dihydroxybenzene moieties are bound to aromatic dicarboxylic acid moieties which may be monocyclic, e.g., isophthalate or terephthalate, or polycyclic, e.g., naphthalenedicarboxylate. Preferably, the aromatic dicarboxylic acid moieties are isophthalate and/or terephthalate. Either or both of said moieties may be present. For the most part, both are present in a molar ratio of isophthalate to terephthalate in the range of about 0.25-4.0:1, preferably about 0.4-2.5:1, more preferably about 0.67-1.5:1, and most preferably about 0.9-1.1:1.

Although both the substrate and the coating layers may thus be copolyestercarbonates, they are different from each other in molecular structure. More specifically, the coating layer will contain resorcinol-derived ester blocks while any ester blocks in the substrate layer will typically be derived from the same bisphenol(s) as the carbonate blocks.

The block copolyestercarbonates may be prepared by a two-step method in which a 1,3-dihydroxybenzene, which may be resorcinol (preferably) or an alkyl- or haloresorcinol, is first contacted under aqueous alkaline reactive conditions with at least one aromatic dicarboxylic acid chloride, preferably isophthaloyl chloride, terephthaloyl chloride or a mixture thereof. The alkaline conditions are typically provided by introduction of an alkali metal hydroxide, usually sodium hydroxide. A catalyst, most often a tertiary amine, tetraalkylammonium, tetraalkylphosphonium or hexaalkylguanidinium halide, is usually also present, as is an organic solvent, generally a water-immiscible solvent and preferably a chlorinated aliphatic compound such as methylene chloride. Thus, the reaction is generally conducted in a 2-phase system.

In order to afford a hydroxy-terminated polyester intermediate, the molar ratio of resorcinol to acyl chlorides is preferably greater than 1:1; e.g., in the range of about 1.01-1.90:1. Base may be present in a molar ratio to acyl halides of about 2-2.5:1. Catalyst is usually employed in the amount of about 0.1-10 mole percent based on combined acyl halides. Reaction temperatures are most often in the range of about 25-50° C.

Following the completion of polyester intermediate preparation, it is sometimes advantageous to acidify the aqueous phase of the two-phase system with a weak acid prior to phase separation. The organic phase, which contains the polyester intermediate, is then subjected to a second step which is the block copolyestercarbonate-forming reaction. It is also contemplated, however, to proceed to said second step without acidification or separation, and this is often possible without loss of yield or purity.

It is also possible to prepare the polyester intermediate entirely in an organic liquid, with the use of a base soluble in said liquid. Suitable bases for such use include tertiary amines such as triethylamine.

The dihydroxyaromatic compound employed in the second step typically has the formula HO—$R^4$—OH, wherein $R^4$ is as previously defined. Bisphenol A is generally preferred. The carbonyl halide is preferably phosgene. This reaction may be conducted according to art-recognized interfacial procedures (i.e., also in a 2-phase system), employing a suitable interfacial polymerization catalyst and an alkaline reagent, again preferably sodium hydroxide, and optionally a branching agent such as 1,1,1-tris(4-hydroxyphenyl)-ethane and/or a chain termination agent such as phenol or p-cumyl-phenol. To suppress scrambling of the block copolymer, the pH is maintained at a relatively low level, typically in the range of about 5-9, for the initial part of the phosgenation reaction; it may be increased to about 10-13 during the latter part of said reaction.

Following completion of both reactions, the block copolyestercarbonate may be isolated by conventional procedures. These may include, for example, anti-solvent precipitation, drying and pelletization via extrusion. It is also contemplated to conduct the first step by other ester-forming methods, as illustrated by transesterification using aromatic diesters and a 1,3-dihydroxybenzene either in a solvent or in the melt.

Upon exposure of the arylate polymer, whether a polyester or a block copolyestercarbonate, to radiation in the visible and/or ultraviolet regions of the spectrum, it is believed that the arylate units therein undergo a photo-Fries rearrangement with migration of at least one carboxy group to the resorcinol ring. The resulting product is a polymer having hydroxybenzophenone or analogous moieties, which are known to be active as UVA's. However, the invention is not dependent on this or any other theory of operation.

The articles of this invention are prepared in the melt, as described hereinafter. As a result, they are substantially free from volatile organic compounds such as solvents, the term "volatile" as used herein designating materials having a vapor pressure at 25° C. greater than 0.5 kPa. This is especially true of the coating layer, any intermediate layer and the 25 microns of the substrate layer adjoining the next layer; i.e., nearest the coating irrespective of whether an intermediate layer is present. By "substantially free" from such compounds is meant a concentration of such compounds no greater than 100 ppm by weight. Similar articles prepared using solution methods typically have residual solvent concentrations in the same region as high as 0.4%, i.e., 4,000 ppm.

In the method of the invention, a coating layer is applied to a layer, which may be either the substrate layer as defined hereinabove or an intermediate layer, comprising a second material. The second material may generally comprise any of those suitable for use as the first material, as defined hereinabove for the substrate, or those suitable for use as the coating layer and may further contain fillers and colorants such as those described hereinabove. When necessary, it may be specifically chosen so as to provide good adhesion between substrate and coating layers. Colorants of the previously described types may also be present in the coating layer.

Application of the coating layer is performed in the melt, so as to avoid solvent-related problems of the type previously mentioned. Suitable methods for application include fabrication of a separate sheet thereof followed by application to the layer of second material as well as simultaneous production of both layers. Thus, there may be employed such methods as co-injection molding, coextrusion, overmolding, multi-shot injection molding, sheet molding and placement of a film of the coating layer material on the surface of the second layer followed by adhesion of the two layers, typically in an injection molding apparatus; e.g., in-mold decoration. These operations may be conducted under art-recognized conditions.

It is also within the scope of the invention to apply in the melt a structure comprising the coating layer and an intermediate layer of second material, the latter being in this case a thermoplastic resin, to a substrate layer, which is generally of the aforementioned first material. This may be achieved, for example, by charging an injection mold with the structure comprising the coating layer and the layer of second material and injecting the substrate behind it. By this method, in-mold decoration and the like are possible. Both sides of the substrate layer may receive the other layers, though it is usually preferred to apply them to only one side.

The thicknesses of the various resin layers in resinous articles of this invention are most often as follows:

substrate—at least about 125μ (microns), preferably at least about 250μ, more preferably at least about 400μ, coating—about 2-2,500, preferably about 10-250 and most preferably about 50-175μ, second material, if any—about 2-2,500, preferably about 10-250, and most preferably about 50-175μ, total—at least about 125μ, preferably at least about 250μ, more preferably at least about 400μ.

The articles of this invention are characterized by the usual beneficial properties of the substrate layer, in addition to weatherability as evidenced by improved resistance to ultraviolet radiation and maintenance of gloss, solvent resistance and recycling capability by regrind and the like. The latter makes it possible to employ the regrind material as a substrate for further production of articles of the invention.

Said articles are suitable for a wide variety of uses. These include exterior body panels and parts for outdoor vehicles and devices including automobiles, protected graphics such as signs, outdoor enclosures such as telecommunication and electrical connection boxes, and construction applications such as roof sections, wall panels and glazing. The invention further contemplates additional fabrication operations on said articles, such as, but not limited to, molding, in-mold decoration, baking in a paint oven, lamination, and/or thermoforming.

Multilayer articles of the invention particularly include articles which will be exposed to UV-light, whether natural or artificial, during their lifetimes, and most particularly outdoor articles; i.e., those intended for outdoor use. Suitable articles are exemplified by automotive, truck, military vehicle, and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

The invention is illustrated by the following non-limiting examples.

EXAMPLE 1

Films of poly(resorcinol isophthalate/terephthalate) (1:1 molar ratio of isophthalate to terephthalate), about 40 microns (μ) thick, were deposited on glass plates by dissolving 10 grams (g) of the polyester in 40 milliliters (ml) of chloroform, drawing onto the plate using a 305-micron doctor blade and drying in air. The films were applied to the surfaces of samples of various colors of a bisphenol A polycarbonate-PBT blend commercially available from General Electric Plastics under the trade designation XENOY 1731, and the resulting structures were heated in a Carver press at about 184-198° C. for 2 minutes, at a pressure of 1.8 metric tons, producing multilayer articles with good adhesion between the layers.

The samples were exposed to weathering in an Atlas Ci35a xenon arc weatherometer equipped with borosilicate inner and outer filters at an irradiance of 0.77 W/m$^2$ at 340 nm. The temperatures were: black panel 70° C., dry bulb 45° C., wet bulb depression 10° C. The cycle was 160 minutes (min) light followed by 5 min dark and 15 min dark with water spray. Samples were evaluated for color on a MacBeth ColorEye 7000A colorimeter with results reported as ΔE* ($\Delta E=(\Delta L^2+\Delta a^2+\Delta b^2)^{0.5}$). Gloss (60°) was measured on a Byk Gardner Micro Trigloss gloss meter. Results of the weathering experiments after 650 kJ/m$^2$ of exposure are shown in Table I, in comparison with controls employing the uncoated bisphenol A polycarbonate-PBT blends.

TABLE I

| | Examples | | | Controls | | |
|---|---|---|---|---|---|---|
| Entry Color | ΔE* | Initial gloss, % | Final gloss, % | ΔE* | Initial gloss, % | Final gloss, % |
| 1 Gray | 2.2 | 100 | 97 | 2.1 | 83 | 7 |
| 2 Green | 0.6 | 100 | 102 | 2.9 | 65 | 26 |
| 3 Blue | 2.9 | 97 | 101 | 3.4 | 89 | 24 |
| 4 Yellow | 1.4 | 99 | 103 | 4.2 | 97 | 49 |
| 5 Light gray | 5.6 | 108 | 101 | 5.9 | 100 | 46 |
| 6 Red | 0.9 | 95 | 99 | 5.9 | 100 | 46 |
| 7 Black | 0.4 | 103 | 101 | 4.9 | 98 | 21 |

It is apparent that the articles of the invention have substantially increased gloss ratings than the corresponding controls, both before and after weathering. Color shifts, ΔE*, were decreased in each case except for the gray article, for which the example and the control had essentially the same values.

EXAMPLE 2

A series of articles with comparable layer thicknesses was prepared as described in Example 1, in which the substrates were commercially available clear and white-pigmented bisphenol A polycarbonates, designated "PCC" and "PCW", respectively; the polycarbonate-polyester blends of Example 1, colored black and designated "PC-PE"; white ABS copolymers, designated "ABS"; and bisphenol A polycarbonate-ABS copolymer blends, colored white and designated "PC-ABS", all commercially available from General Electric Plastics. As coating layers, there were used block copolyester-carbonates containing bisphenol A carbonate units and resorcinol iso/terephthalate units similar to those of Example 1, said block copolyestercarbonates containing 50% and 80% polyester moieties, designated "PEC-50" and "PEC-80", respectively. There was good adhesion between the layers in each instance.

The articles were evaluated for gloss as described in Example 1, except that the second series of gloss readings was taken after an exposure of 6035 kJ/m².

The results are given in Table II, in comparison with four controls in which no coating layer was present.

TABLE II

| Entry | Substrate | Coating | Initial gloss, % | Final gloss, % |
|---|---|---|---|---|
| 8 | PCC | PEC-80 | 119 | 127 |
| 9 | PCC | PEC-50 | 119 | 125 |
| Control 1 | PCC | — | 152 | 110 |
| 10 | PCW | PEC-80 | 105 | 107 |
| 11 | PCW | PEC-50 | 98 | 102 |
| Control 2 | PCW | — | 102 | 4* |
| 12 | ABS | PEC-80 | 109 | 110 |
| 13 | PC-ABS | PEC-50 | 106 | 113 |
| Control 3 | PC-ABS | — | 96 | 2* |
| 14 | PC-PE | PEC-80 | 105 | 110 |
| 15 | PC-PE | PEC-50 | 104 | 105 |
| Control 4 | PC-PE | — | 100 | 20** |

*At 1048 kJ/m².
**At 560 kJ/m².

By comparison of Entries 8-9 with Control 1, Entries 10-11 with Control 2, of Entry 13 with Control 3 and of Entries 14-15 with Control 4, it will be seen that the articles of the retained gloss in excellent fashion, while the controls could not even survive the length of the test. Although no control is provided for entry 12, the decrease in gloss for uncoated, white pigmented ABS is very rapid and demonstrates a serious lack of weatherability.

EXAMPLE 3

A series of articles was prepared by the method of Example 1, using as second layers commercially available clear and pigmented sheets of commercially available bisphenol A polycarbonates having thicknesses of about 250μ, the pigments employed being titanium dioxide, carbon black and a yellow pigment package, and as the coating layer the arylate polymers of Examples 1-2 ("PE" and "PEC-50", respectively). The multilayer intermediate articles thus prepared were placed in an cavity and various bisphenol A polycarbonate-containing resins designated as in Example 2 were injected behind them at an injection temperature in the range of 270-290° C. and molded at an injection boost pressure of 8274 kPa and an injection hold pressure of 6895 kPa, a hold time of 6 seconds (sec) and a cooling time of 20 sec to produce multilayer in-mold decorated articles, whereupon the second layer became an intermediate layer between the substrate and coating layer. The articles were evaluated for gloss according to Example 1.

The results, after an exposure of 1786 kJ, are given in Table III, in comparison with five controls. Also evaluated were a number of articles having no second layer.

TABLE III

| Entry | Substrate | Intermediate layer color | Coating layer (μ) | Initial gloss, % | Final gloss, % |
|---|---|---|---|---|---|
| 16 | PCC | Black | PE (40) | 104 | 111 |
| 17 | PCC | White | PE (40) | 107 | 115 |
| 18 | PCC | — | PEC-50 (80) | 148 | 147 |
| Control 4 | PCC | — | — | 144 | 127 |
| 19 | PCW | Clear | PE (40) | 105 | 112 |
| 20 | PCW | Yellow | PE (40) | 108 | 113 |
| 21 | PCW | Black | PE (40) | 104 | 114 |
| 22 | PCW | — | PEC-50 (80) | 109 | 110 |
| Control 5 | PCW | — | — | 105 | 2 |
| 23 | PC-PE | Black | PE (40) | 103 | 111 |
| Control 6 | PC-PE | Black | — | 30 | 2 |
| 24 | PC-PE | White | PE (40) | 108 | 113 |
| Control 7 | PC-PE | White | — | 102 | 3 |
| 25 | PC-PE | White | PE (40) | 108 | 114 |
| Control 8 | PC-PE | — | — | 104 | 3 |

A comparison of the corresponding control with the entries in each data set demonstrates the improved gloss retention of the articles of the invention, whether or not they contained a second layer.

EXAMPLE 4

Multilayer articles similar to those of Examples 1-3, as well as single layers of polycarbonate and polyester-polycarbonate blend, were tested for solvent resistance by applying two drops of toluene, allowing the toluene to remain on the surface for 2 minutes, wiping with a cotton swab at 1 and 2 minutes and inspecting for damage. Dissolution of the surface with total loss of gloss, combined with residue on the swab, was considered severe damage, loss of gloss with no apparent dissolution of the surface or appearance of residue was considered moderate damage, and the appearance of some cloudiness on the surface was considered light damage.

It was found that polycarbonate and polyester-polycarbonate blend were severely damaged after 1 minute. PEC-50 was slightly damaged after 1 minute and moderately damaged after 2 minutes. PE sustained no visible damage after 2 minutes.

EXAMPLE 5

The in-mold decorated articles of Example 3 are capable of processing by regrinding and injection molding, producing compatible resinous articles of excellent morphology and physical properties, the latter including high impact strength.

EXAMPLE 6

A film of the arylate polymer of Example 1, 30.5 cm wide and 254μ thick, was prepared by extrusion and placed on top of a film of commercially available bisphenol A polycarbonate, 101.6 cm square and 254μ thick. The stacked films were heated in a hydraulic press at 200°/atmospheric pressure, 31,028 kPa and 44,818 kPa for one minute each, forming a well adhered laminate. Analysis for residual solvent by thermal desorption gas chromatography-mass spectroscopy showed a residual chloroform level (from processing of the polycarbonate) less than 0.1 ppm by weight.

In a control experiment, a solution of 2 g of the arylate polymer in 18 ml of chloroform was applied to a 254-μ sheet of the same polycarbonate with a doctor blade and the solvent was evaporated, providing a coating with a thickness of 12.7μ. The coated sheet was allowed to air dry overnight, yielding an article of excellent surface appearance. This article was placed in a programmed forced air oven and the temperature was raised from 35° to 125° C. over 16 hours, at a constant rate of 10°/min, held at 125° for one hour and cooled to room temperature. The surface of the article was severely blistered. Analysis by the same method showed the presence of chloroform in a concentration of 0.4% (4,000 ppm) by weight.

EXAMPLE 7

An arylate polymer film identical to that of Example 6 was placed in the cavity of an injection mold and molded into a multilayer article with a bisphenol A polycarbonate-PBT blend commercially available from General Electric Plastics under the trade designation XENOY 1732. The resulting in-mold decorated article was flat and the arylate polymer film was well adhered to the substrate. Upon heating in an oven at 120° C. for 14 hours and 180° C. for 8 hours, the article remained intact and showed no trace of bubbling, cracking or blistering. A control experiment, similar to that of Example 6, provided an article with a blistered surface.

EXAMPLE 8

The procedure of Example 7 was repeated using as the coating layer a block copolyestercarbonate consisting of 50 mole percent bisphenol A carbonate units, 25 mole percent resorcinol isophthalate units and 25 mole percent resorcinol terephthalate units. The result was similar.

What is claimed is:

1. An article comprising;
   (A) a fluorescent polymeric layer comprising a fluorescent dye; and
   (B) an ultraviolet light screening layer comprising a polymeric resin, said polymeric resin comprising at least one polymer, or a mixture thereof, selected from the group consisting of:
   (i) polymers having a polymeric backbone comprising the following repeating moiety A;

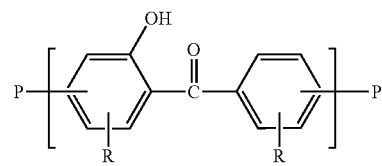

wherein R is a non-interfering substitutent and P is the remainder of the polymer; and
   whereby the polymers are able to absorb ultraviolet light; and
   (ii) polymers having a polymeric backbone comprising the following repeating moiety B:

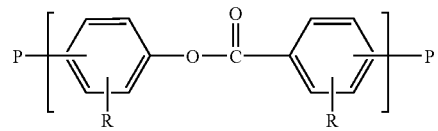

wherein R is a non-interfering substitutent and P is the remainder of the polymer; said moiety B being transformable to said moiety A by photo-Fries rearrangement, whereby said polymer comprising moiety B can be transformed to an ultraviolet light absorbing polymer comprising moiety A.

2. An article comprising:
   (A) a fluorescent polymeric layer comprising a fluorescent dye; and
   (B) an ultraviolet light screening layer comprising a polymeric resin, said polymeric resin comprising at least one polymer, or a mixture thereof, which either is, or is capable of undergoing rearrangement into a U.V. light absorbing polymer material.

3. A multilayer resinous article comprising:
   a fluorescent substrate layer comprising a first material and
   a coating layer thereon, said coating layer comprising a thermoplastic polyester different from said first material and comprising structural units derived from a 1,3-dihydroxybeuzene organodicarboxylate capable of undergoing rearrangement into an ultraviolet light absorbing polymer material.

* * * * *

UNITED STATES PATENT AND TRADEMARK OFFICE
CERTIFICATE OF CORRECTION

| | |
|---|---|
| PATENT NO. | : 7,273,650 B2 |
| APPLICATION NO. | : 10/409067 |
| DATED | : September 25, 2007 |
| INVENTOR(S) | : James Edward Pickett et al. |

It is certified that error appears in the above-identified patent and that said Letters Patent is hereby corrected as shown below:

Title Page, Item (56), Col. 2, Line 22, Delete "Brnelle et al." and insert -- Brunelle et al. --, therefor.

Col. 1, line 45, Delete "J" and insert -- J. --, therefor.

Col. 3, line 38, Delete "celluosic" and insert -- cellulosic --, therefor.

Col. 4, line 38 (approx.), After ""PCCD")" delete "," and insert -- . --, therefor.

Col. 6, line 29, Delete "$R_1$" and insert -- $R^1$ --, therefor.

Col. 6, line 48, Delete "0.67-1.5: 1," and insert -- 0.67-1.5:1, --, therefor.

Col. 11, line 67, Before "retained" insert -- invention --.

Col. 12, line 30, After "an" insert -- injection mold --.

Col. 13, line 42, Delete "254-μ" and insert -- 254μ --, therefor.

Col. 13, line 49, Delete "125°" and insert -- 125° C. --, therefor.

Col. 14, line 28, In Claim 1, Delete "substitutent" and insert -- substituent --, therefor.

Col. 14, line 63, In Claim 3, Delete "1,3-dihydroxybeuzene" and insert -- 1,3-dihydroxybenzene --, therefor.

Signed and Sealed this
Thirteenth Day of March, 2012

David J. Kappos
*Director of the United States Patent and Trademark Office*